United States Patent
Moetakef et al.

(10) Patent No.: US 10,801,391 B2
(45) Date of Patent: Oct. 13, 2020

(54) VIBRATION DAMPING ISOLATOR FOR A VEHICLE

(71) Applicant: Ford Global Technologies, LLC, Dearborn, MI (US)

(72) Inventors: Mohammad Ali Moetakef, West Bloomfield, MI (US); Muhammad Umar Farooq, Farmington Hills, MI (US); Yasir Farhan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 15/945,134

(22) Filed: Apr. 4, 2018

(65) Prior Publication Data
US 2019/0309672 A1    Oct. 10, 2019

(51) Int. Cl.
*F16F 1/36* (2006.01)
*F01N 13/18* (2010.01)
*F16F 15/08* (2006.01)
*F16L 55/035* (2006.01)

(52) U.S. Cl.
CPC ........ *F01N 13/1822* (2013.01); *F16F 15/085* (2013.01); *F16L 55/035* (2013.01); *F16F 2230/0005* (2013.01)

(58) Field of Classification Search
CPC .......... F01N 13/1822; F16F 2230/0005; F16F 15/085; F16F 1/3842; F16F 7/108; F16L 55/035; B60K 13/04
USPC ............ 248/573; 267/292, 293, 136, 140.11, 267/140.12; 180/296, 309
See application file for complete search history.

(56) References Cited

U.S. PATENT DOCUMENTS

| | | | |
|---|---|---|---|
| 6,264,164 B1 * | 7/2001 | Steinmaier | B60K 13/04 248/610 |
| 6,758,300 B2 * | 7/2004 | Kromis | B60K 13/04 180/296 |
| 7,644,911 B2 * | 1/2010 | Rodecker | F16F 1/373 267/293 |
| 2005/0194728 A1 * | 9/2005 | Molet | F16F 1/3873 267/151 |
| 2011/0244968 A1 | 10/2011 | Chang | |

FOREIGN PATENT DOCUMENTS

| | | |
|---|---|---|
| DE | 19906548 C1 | 5/2000 |
| EP | 0505325 A1 | 9/1992 |

* cited by examiner

*Primary Examiner* — Todd M Epps
(74) *Attorney, Agent, or Firm* — Brooks Kushman P.C.; Geoffrey Brumbaugh

(57) ABSTRACT

An isolator for suspending a vehicle component from a chassis is provided. The isolator has an elastomeric body defining first and second apertures therethrough. The isolator has a first support bracket extending through a first outer region of the body. A second support bracket extends through a second outer region of the body. The isolator has first and second flexible couplings, with each coupling connecting the first support to the second support. A method of forming the isolator is also provided.

20 Claims, 4 Drawing Sheets

US 10,801,391 B2

VIBRATION DAMPING ISOLATOR FOR A VEHICLE

TECHNICAL FIELD

Various embodiments relate to an isolator for a vehicle, such as an isolator for an exhaust system component in the vehicle.

BACKGROUND

Isolators may be used for connecting components together while preventing or reducing vibrations or excitations from an active side to a passive side of the isolator. The isolator may be required to have supporting structural components based on the application and to meet durability requirements; however, the stiffness of these components may result in reduced performance of the isolator and associated increased noise, vibration, and harshness (NVH) issues.

SUMMARY

In an embodiment, an isolator is provided with an elastomeric body defining first and second apertures therethrough. The isolator has a first support bracket extending through a first outer region of the body. A second support bracket extends through a second outer region of the body. The isolator has first and second flexible couplings, with each coupling connecting the first support bracket to the second support bracket.

In another embodiment, a vehicle is provided with a chassis having a first hanger extending therefrom. An isolator includes an elastomeric body defining first and second apertures therethrough, a first metal support bracket extending through a first outer region of the body, a second metal support bracket extending through a second outer region of the body, and first and second flexible couplings. Each coupling connects the first bracket to the second bracket. The first hanger extends through the first aperture. A vehicle component is suspended from the chassis by a second hanger extending through the second aperture of the isolator.

In yet another embodiment, a method of forming an isolator is provided. First and second support brackets are provided with each support bracket extending from a first end to a second end. An elastomeric member is formed with first and second apertures therethrough. The elastomeric member is formed about each of the first and second support brackets such that an intermediate region of each of the brackets is embedded in an outer perimeter region of the elastomeric member, and such that the first and second support brackets are spaced apart from and opposite to one another. First ends of each of the support brackets are connected to one another with a first flexible coupling. Second ends of each of the support brackets are connected to one another with a second flexible coupling.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
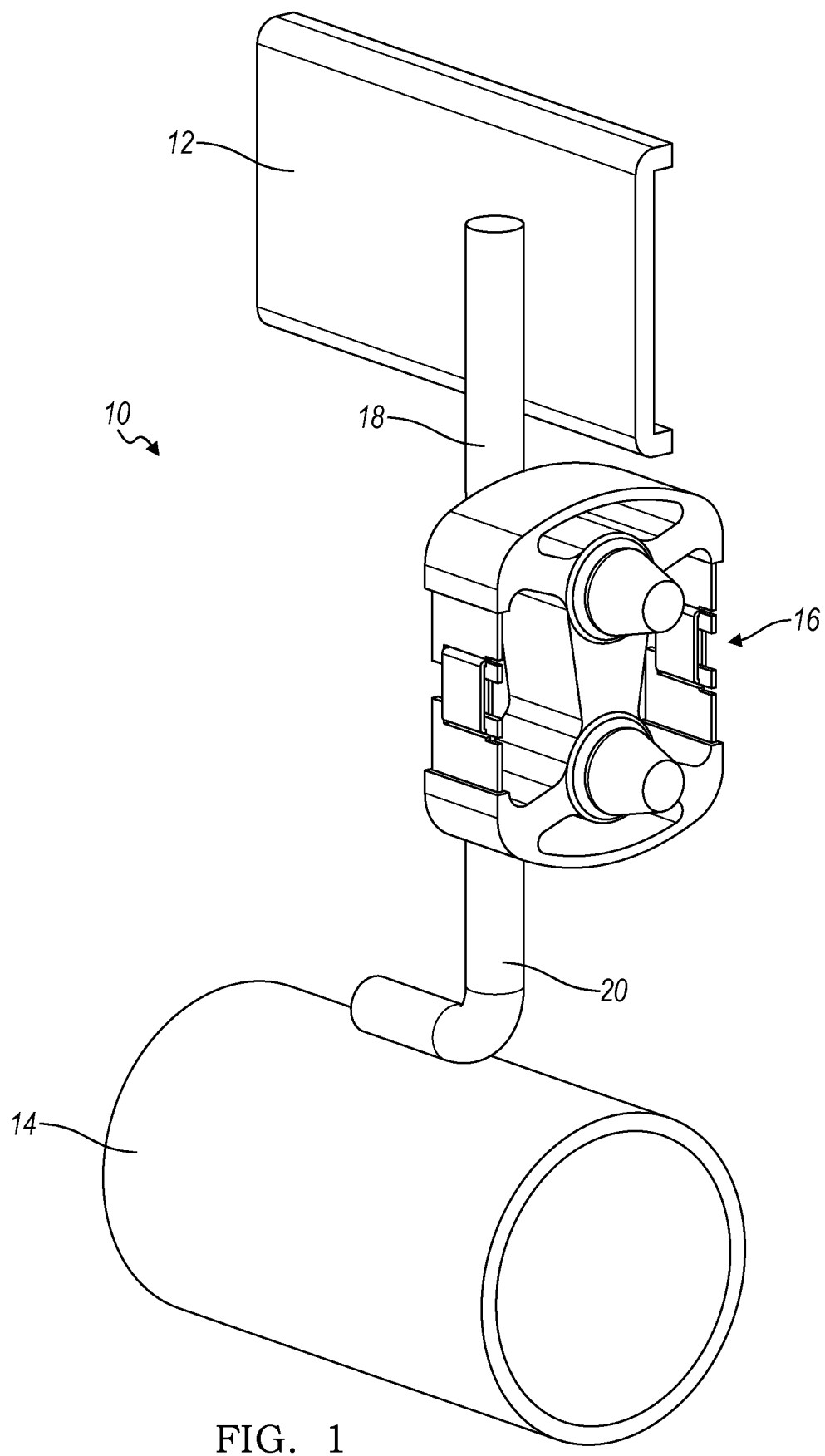
FIG. 1 illustrates a particle schematic view of a vehicle according to an embodiment.

FIG. 1 illustrates a vehicle 10. The vehicle 10 has a chassis 12 or frame. The vehicle has a component 14 connected to the chassis 12. In one example, the component 14 may be a part of an engine exhaust system, for example, an exhaust pipe, an exhaust aftertreatment device, a muffler, or the like.

The vehicle component 14 is suspended from the chassis 12 via one or more isolators 16. The isolator 16 is connected to the chassis 12 by a first hanger 18. The isolator 16 is connected to the vehicle component 14 by a second hanger 20. Each hanger 18, 20 may be provided by a metal bar that is connected to the respective element 12, 14, for example, via welding. The end of the metal bar 18, 20 may be shaped to fit through an associated aperture or mounting point in the isolator 16, and in one example, is provided with an enlarged end region that prevents removal of the respective hanger 18, 20 from the isolator 16 after installation.

The isolator 16 is used to reduce or prevent the transmission of vibration or excitation therethrough, while also acting as a connecting element in the vehicle 10. The isolator 16 is provided for passive vibration isolation of the suspended component 14. For example, a vehicle component 14 such as a part in an engine exhaust system may vibrate during engine operation, and act as the active side or source to the isolator 16. The isolator 16 is connected to the frame 12 of the vehicle, which acts as the passive side of the isolator 16. The isolator 16 acts to prevent the vibrations from being transmitted from the active side to the passive side, e.g. from the exhaust system 14 to the frame 12 of the vehicle 10 to isolate the exhaust system 14. The isolator 16 includes an elastomeric element, or other flexible or elastic member, to absorb and damp vibrations and prevent the transmission of these vibrations to the passive side. The elastomeric element may be formed from a rubber, synthetic rubber, vulcanized or treated rubber, or other elastic material.

For certain applications, such as heavy-duty applications in a truck, the isolator 16 may additionally be provided with a rigid metal support structure to increase durability of the isolator. In a conventional isolator, the metal support structure is provided as a continuous circumferential rigid band about an outer perimeter of the isolator. While this continuous rigid metal band provides increased durability for a conventional isolator, it also may provide a pathway for transmitting the excitations, vibrations, and road shake to the frame of the vehicle and to the passenger compartment. The stiffness of the continuous metal band may therefore reduce the overall effectiveness of a conventional isolator and lead to associated NVH issues for a vehicle user.

The isolator 16 according to the present disclosure provides for a flexible coupling between the active and passive sides of the isolator, while retaining the rigid support structure needed for isolator durability with first and second support brackets. In one example, the flexible couplings are provided by sections of metal braid as described in detail below. The flexible couplings provide for improved isolation and improved NVH performance. The flexible couplings remove the rigid connection between the active and passive sides of the isolator 16 that is present in a conventional isolator with the continuous metal band such that fewer forces, vibrations and shake are transmitted from the active side to the passive side. The flexible couplings in the isolator 16 of the present disclosure therefore further decouple the active and passive sides of the isolator and provide reduced NVH from the active side to the frame or passive side.

Figure 2:
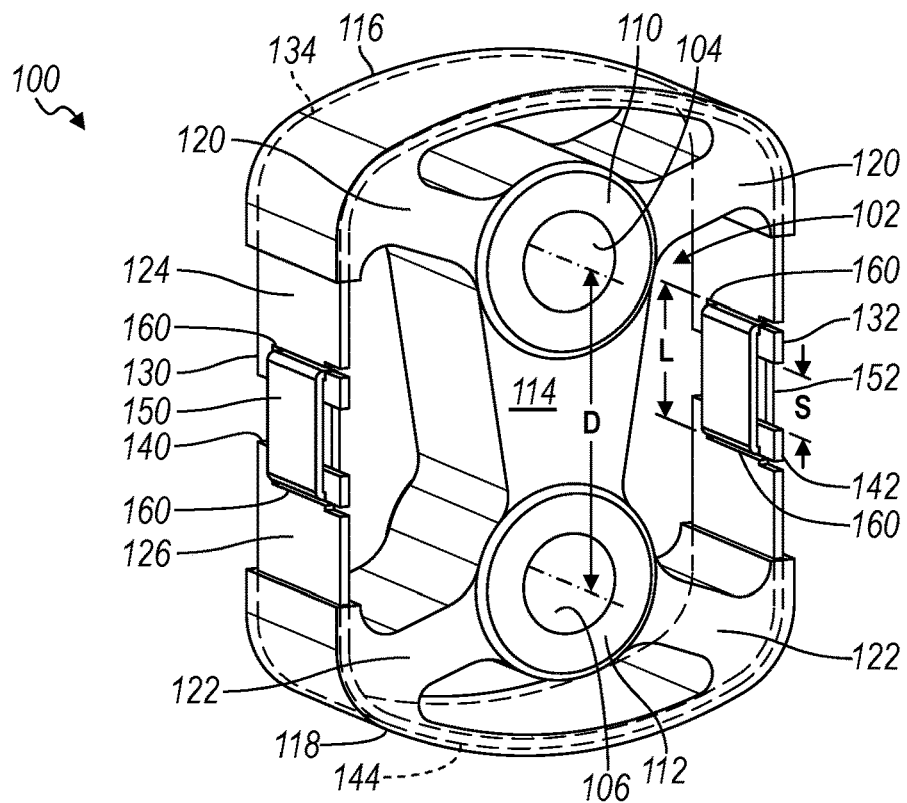
FIG. 2 illustrates a perspective view of an isolator according to an embodiment.
Figure 3:
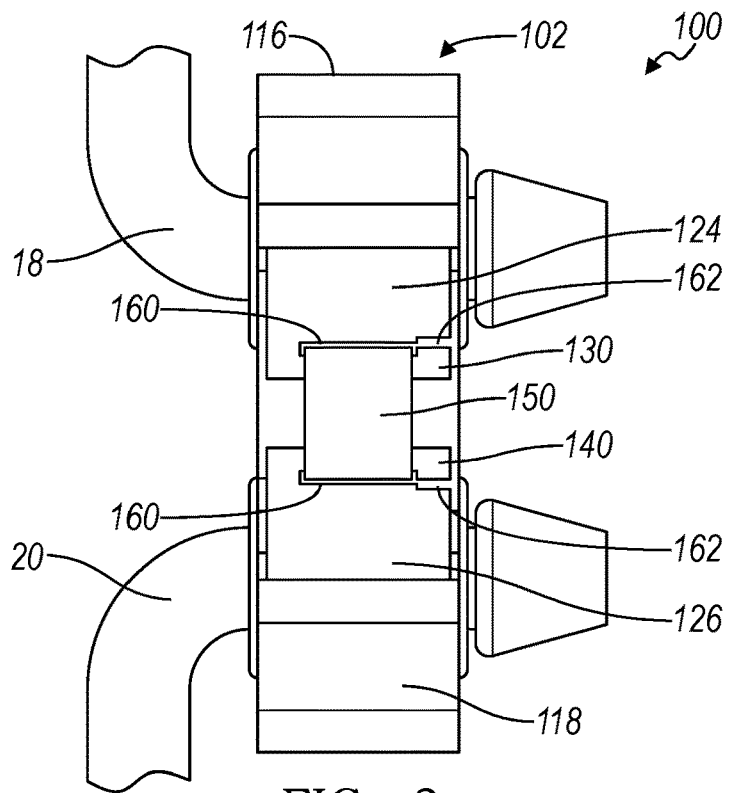
FIG. 3 illustrates a side view of the isolator of FIG. 2.
Figure 4:
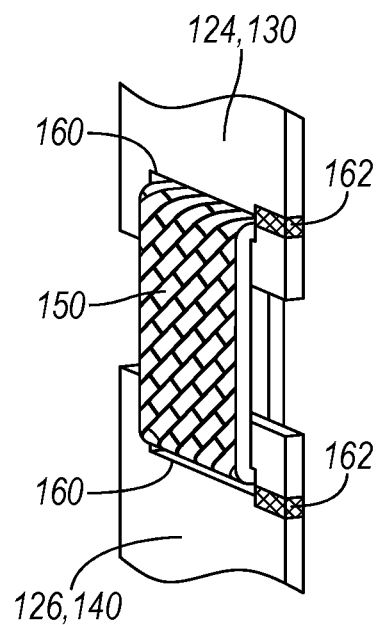
FIG. 4 illustrates a partial perspective view of the isolator of FIG. 2.

FIGS. 2-4 illustrate an isolator 100 according to an embodiment. The isolator 100 may be used as the isolator 16 of FIG. 1.

The isolator 100 has an elastomeric body or member 102. The elastomeric body 102 may be provided as a single integral structure as shown, and may be formed from a material with uniform elastic properties or may be formed with layers or regions with differing elastic properties. The elastomeric body 102 defines a first aperture 104 and a second aperture 106 therethrough. Each aperture 104, 106 is sized to receive and retain an associated hanger 18, 20. The apertures 104, 106 may be longitudinally spaced apart from one another. Each aperture 104, 106 may be provided with a cylindrical shape as shown, or with another shape based on the shape and configuration of the hanger. Likewise, the apertures 104, 106 may be the same size or a different size.

The elastomeric body 102 has a first cylindrical portion 110 or portion with another shape that surrounds and defines the first aperture 104. The elastomeric body 102 also has a second cylindrical portion 112 or portion with another shape that surrounds and defines the second aperture 106. The first and second portions 110, 112 are connected to one another via a central support portion 114 that extends longitudinally between the portions as shown. The central support portion 114 may be provided with a constant cross-sectional area, or as a tapering area between the portions 110, 112 to control the transmission of vibrations and forces between the hangers. The central support portion 114 therefore acts to limit and restrict the travel or movement between the first and second apertures 104, 106 under both tensile and compressive loads. As the central support portion 114 is formed from the elastomeric material, it also absorbs or damps vibrations.

The elastomeric body 102 has an outer perimeter region that is split into a first outer perimeter portion 116 and a second outer perimeter portion 118. The first and second outer perimeter portions 116, 118 cooperate to define an outer circumferential surface for the isolator 100.

The first outer perimeter portion 116 is connected to the first portion 110 by wings 120, such as first and second wings, although another number of wings is also contemplated. The second outer perimeter portion 118 is connected to the second portion 112 by wings 122, such as third and fourth wings, although another number of wings is also contemplated.

The first and second wings 120 may be symmetrically or asymmetrically arranged in relation to the third and fourth wings 122. In further examples, the second outer perimeter portion 118 may be connected to the second portion 112 by a greater or fewer number of wings compared to the first portion 110 and first outer perimeter portion 116. The presence of the central support portion 114 reduces the stress on the wings 120, 122 when the isolator 100 is under load, and increases the overall durability of the isolator.

The isolator 100 has a first support bracket 124 extending along a first circumferential region of the body 102. The isolator 100 also has a second support bracket 126 extending along a second circumferential region of the body 102. The first and second support brackets 124, 126 are spaced apart from one another and occupy different perimeter regions of the body 102 such that they are non-overlapping.

Each of the first and second support brackets 124, 126 are provided by a strip of a rigid material, such as a solid metal, metal alloy, or another suitable material. The support brackets 124, 126 may be the same size, or may be different sizes. Each support bracket 124, 126 is shaped, e.g. bent or curved, to correspond with the shape of the elastomeric body 102. The support brackets 124, 126 cooperate to provide structural support for the elastomeric body 102 and increased durability for the isolator. The support brackets 124, 126 also provide hanging support for the flexible couplings 150, 152 described below.

The first strip of the first support bracket 124 extends from a first end 130 to a second end 132. An intermediate region 134 of the first strip is embedded within the first outer perimeter portion 116 of the elastomeric body 102.

The second strip of the second support bracket 126 extends from a first end 140 to a second end 142. An intermediate region 144 of the second strip is embedded within the second outer perimeter portion 118 of the elastomeric body 102.

The first ends 130, 140 of each of the first and second support brackets 124, 126 are spaced apart from one another and opposed from one another. The second ends 132, 142 of each of the first and second support brackets 124, 126 are spaced apart from one another and opposed from one another.

The isolator 100 has a first flexible coupling 150 and a second flexible coupling 152. The first and second flexible couplings 150, 152 are arranged on opposed sides of the elastomeric body 102. The first and second flexible couplings 150, 152 connect the first and second support brackets 124, 126 to one another. The first flexible coupling 150 extends between and connects the first end 130 of the first support bracket 124 to the first end 140 of the second support bracket 126. The second flexible coupling 152 extends between and connects the second end 132 of the first support bracket 124 to the second end 142 of the second support bracket 126.

The flexible couplings 150, 152 may be provided by a section of metal braid, or another suitable braided material. In other examples, the flexible couplings 150, 152 may be provided by a section of metal cable, series of links, or other suitable connection allowing for movement of the brackets relative to one another.

In one example, each of the first and second ends 130, 140, 132, 142 of the first and second support brackets 124, 126 define a slot 160. The first and second flexible couplings 150, 152 are each provided as a loop or band of braid that are inserted into the associated slots 160 to connect the first and second support brackets 124, 126 to one another. The flexible couplings 150, 152 therefore extend through the associated slots 160 as shown. The slots 160 may then be closed, for example, by bending the ends of the support brackets 124, 126 adjacent to the slots to close the gaps, by using a spot weld 162, or the like.

In another example, the flexible couplings 150, 152 may be provided as a single layer of metal braid that is connected directly to the associated ends 130, 140, 132, 142 of the support brackets 124, 126, for example, via a welding process.

The first support bracket 124, the first flexible coupling 150, the second support bracket 126, and the second flexible coupling 152 are arranged sequentially about an outer perimeter region of the elastomeric body 102, and cooperate to extend continuously and circumferentially about the outer perimeter region of the elastomeric body 102.

The center-to-center distance between the first and second apertures 104, 106, the cross-sectional area of the central support portion 114, distance or spacing between the ends of the support brackets 124, 126 and the length of each of the flexible couplings 150, 152 may be selected to provide the desired amount of stretch or travel between the apertures 104, 106 under load such that the isolator 100 has sufficient play or travel to damp vibrations while not being overly flexible and raising durability concerns.

For example, the first and second flexible couplings 150, 152 may be positioned longitudinally between the first and second apertures 104, 106. The length L of each of the flexible couplings 150, 152 may be less than the center-to-center distance D of an unloaded or statically loaded state isolator as shown. In other examples, the length L of each of the flexible couplings 150, 152 may be greater than the center-to-center distance D of an unloaded or statically loaded isolator. The length L of each flexible couplings 150, 152 may be selected to be unloaded or under a slight tensile load with the isolator in an unloaded or statically loaded state.

In one example, the spacing S between the ends 130, 140, 132, 142 of the support brackets 124, 126 may be on the order of 10-30 percent of the overall longitudinal length of the isolator 100, and may be on the order of 15-75 percent of the center-to-center distance D.

Figure 5:
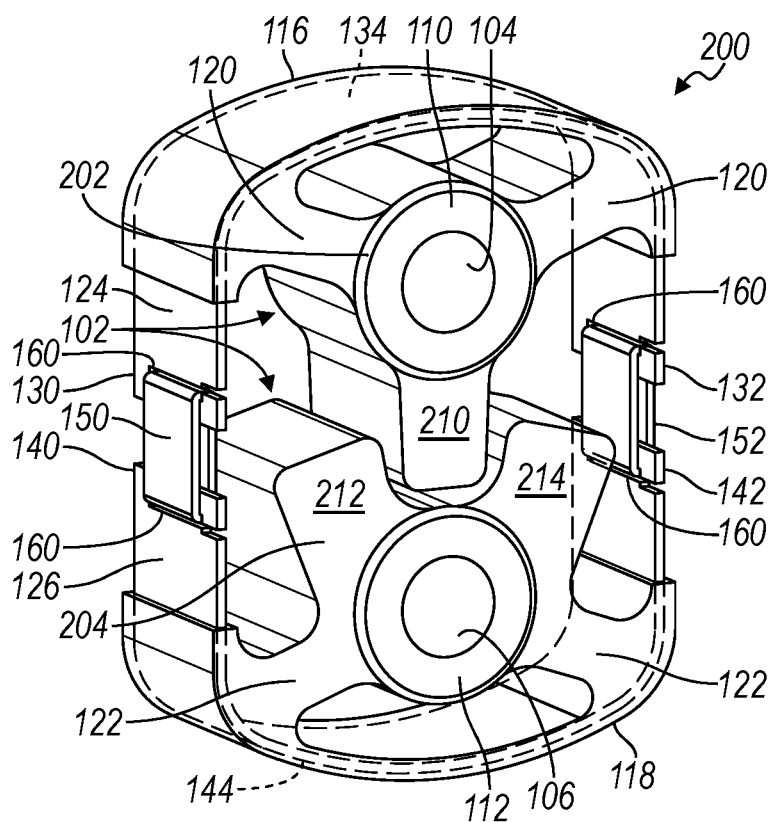
FIG. 5 illustrates a perspective view of an isolator according to another embodiment.
Figure 6:
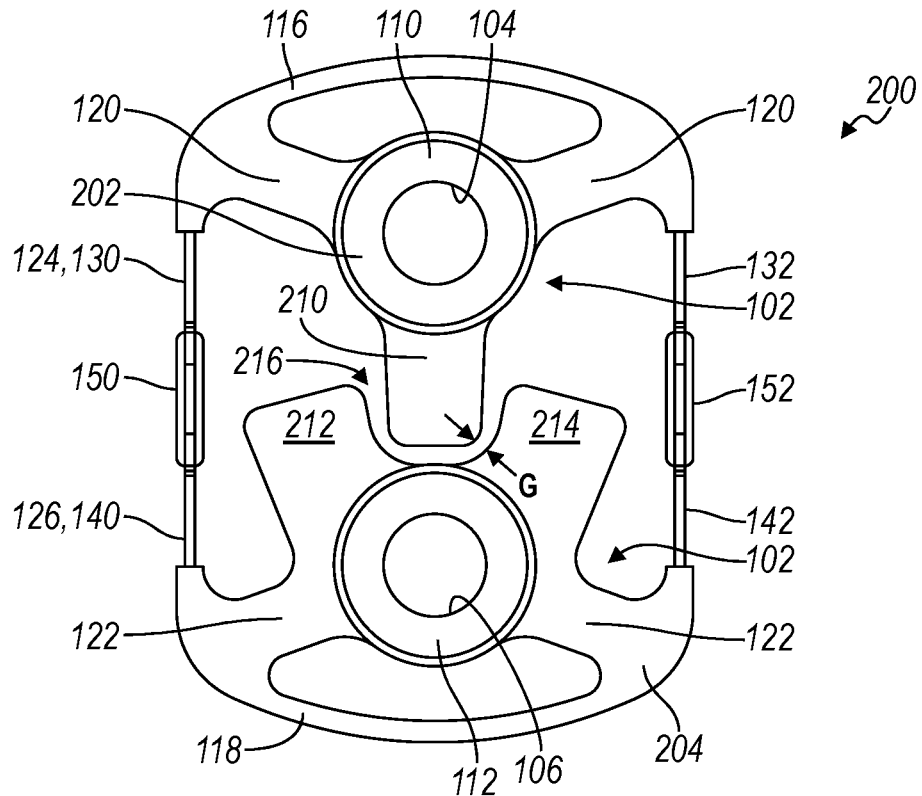
FIG. 6 illustrates a front view of the isolator of FIG. 5.

FIGS. 5-6 illustrate an isolator 200 according to another embodiment. The isolator 200 may be used as the isolator 16 of FIG. 1. Elements of the isolator 200 that are the same as or similar to those described with respect to the isolator 100 of FIGS. 2-4 are given the same reference numbers for simplicity.

The isolator 200 has the elastomeric body 102 is provided by first and second sections 202, 204, such that the elastomeric body 102 is formed by two separate components 202, 204 made of an elastomeric material. In one example, the first and second sections 202, 204 are formed from the same material or having the same elastic properties, and in other examples, the sections 202, 204 may be formed from materials with different elastic properties.

The first section 202 is provided with the first portion 110, the first outer perimeter portion 116, and the first and second wings 120. The second section 204 is provided with the second portion 112, the second outer perimeter portion 118, and the third and fourth wings 122. The first section 202 and the second section 204 are spaced apart from one another.

In one example, and as shown, the first and second sections 202, 204 have bumper elements that cooperate with one another to provide some limitation on the motion between the first and second sections under dynamic load, for example, by limiting the longitudinal movement between the apertures 104, 106 under compressive load and by limiting transverse movement between the apertures 104, 106.

For example, the first section 202 may have a first bumper 210 extending outwardly from the first portion 110 and towards the second section 204. The second section 204 may have second and third bumpers 212, 214 extending outwardly from the second portion 112 and towards the first section 202. A recess 216 is defined between the second and third bumpers 212, 214 and is sized to receive the first bumper 210, such that the first bumper 210 extends into the recess 216. The first bumper 210 is spaced apart from the second and third bumpers 212, 214 by a minimum gap distance G with the isolator 200 in an unloaded or statically loaded state. The outer surface of the first bumper 210 may interface with the outer surfaces of the second and third bumpers 212, 214 to limit movement of the first section 202 relative to the second section 204. In other examples, the bumper elements 210, 212, 214 on the first and second sections 202, 204 may have other shapes and sizes.

The isolator 200 has a greater degree of flexibility than the isolator 100 of FIGS. 2-4 as there is no central support portion 114 in the isolator 200. The isolator 200 therefore provides a greater degree of isolation between the active and passive sides.

The first and second sections 202, 204 of the isolator 200, and therefore the first and second cylindrical portions 110, 112, are connected to one another only via the first and second flexible couplings 150, 152. Therefore, a load from the second hanger 20 and second section 204 of the elastomeric body 102 to the first hanger 18 and first section 202 of the elastomeric body 102 is entirely supported by the first and second flexible couplings 150, 152.

Figure 7:
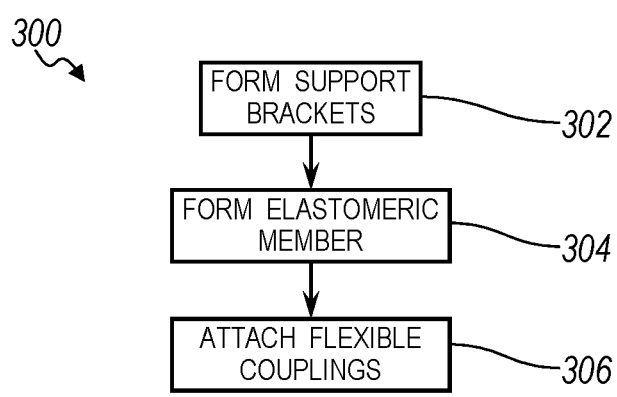
FIG. 7 illustrates a flow chart for a method of forming an isolator according to an embodiment.

FIG. 7 illustrates a flow chart for a method 300 of forming the isolator 16, 100, 200 according to an embodiment. In other embodiment, various steps in the method 300 may be rearranged, combined, or omitted.

At step 302, first and second support brackets 124, 126 are formed and provided.

At step 304, the elastomeric member 102 is formed with first and second apertures 104, 106 therethrough. The elastomeric member 102 is formed about each of the first and second support brackets 124, 126 such that an intermediate region 134, 144 of each of the support brackets 124, 126 are embedded in the outer perimeter region 116, 118 of the elastomeric member. The support brackets 124, 126 are positioned in the elastomeric member 102 such that they are spaced apart from one another and generally opposite to one another. In one example, the elastomeric member 102 is formed as a single integral body 102 with having first and second apertures 104, 106 therethrough. In another example, the elastomeric member 102 is formed as separate first and second sections 202, 204, with the first section 202 defining the first aperture 104 and having the first support bracket 124 embedded therein, and the second section 204 defining the second aperture 106 and having the second support bracket 126 embedded therein. The first and second sections 202, 204 may be formed with bumper elements 210, 212, 214.

At step 306, the first ends 130, 140 of each of the support brackets 124, 126 are connected to one another with a first flexible coupling 150. The second ends 132, 142 of each of the support brackets 124, 126 are connected to one another with a second flexible coupling 152. For an elastomeric body 102 with two separate sections 202, 204, the first and second flexible couplings 150, 152 therefore connect the first and second sections 202, 204 of the elastomeric member 102 to one another.

In a further example, the flexible couplings 150, 152 may be connected to the support brackets 124, 126 prior to forming the elastomeric body 102, such that the ends 130, 132, 140, 142 of the support brackets 124, 126 and flexible couplings 150, 152 are also embedded within the elastomeric body 102, and no metal surfaces are exposed.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An isolator comprising:
an elastomeric body defining first and second apertures therethrough;
a first support bracket extending through a first outer region of the body;
a second support bracket extending through a second outer region of the body; and
first and second flexible couplings, wherein each coupling connects the first support bracket to the second support bracket.

2. The isolator of claim 1 wherein the first support bracket, the first flexible coupling, the second support bracket, and the second flexible coupling are arranged sequentially about an outer perimeter region of the elastomeric body.

3. The isolator of claim 1 wherein the first and second support brackets each comprise a rigid metal strip; and
wherein the first and second flexible couplings each comprise metal braid.

4. The isolator of claim 1 wherein the first and second flexible couplings are arranged on opposed sides of the elastomeric body; and
wherein the first and second flexible couplings are positioned longitudinally between the first and second apertures.

5. The isolator of claim 1 wherein each of the first and second support brackets extend from a first end to a second end;
wherein the first ends of each of the first and second support brackets are spaced apart from one another and opposed from one another;
wherein the second ends of each of the first and second support brackets are spaced apart from one another and opposed from one another;
wherein the first flexible coupling extends between and is connected to the first ends of each of the first and second support brackets, respectively; and
wherein the second flexible coupling extends between and is connected to the second ends of each of the first and second support brackets respectively.

6. The isolator of claim 5 wherein each flexible coupling is welded to each of the first and second support brackets.

7. The isolator of claim 5 wherein the first and second ends of each of the first and second support brackets is provided with a slot; and
wherein each flexible coupling extends through the slots of the first and second support brackets, respectively.

8. The isolator of claim 1 wherein an intermediate region of each of the first and second support brackets are embedded in the elastomeric body.

9. The isolator of claim 1 wherein the first and second apertures of the elastomeric body are longitudinally spaced apart from one another.

10. The isolator of claim 1 wherein the elastomeric body comprises a first cylindrical portion defining the first aperture, a second cylindrical portion defining the second aperture, a first outer perimeter portion connected to the first cylindrical portion by first and second wings, and a second outer perimeter portion connected to the second cylindrical portion by third and fourth wings;
wherein the first support bracket is embedded in the first outer perimeter portion; and
wherein the second support bracket is embedded in the second outer perimeter portion.

11. The isolator of claim 10 wherein the elastomeric body further comprises a central support portion extending from the first cylindrical portion to the second cylindrical portion.

12. The isolator of claim 10 wherein the elastomeric body comprises a first section and a second section, the first and second sections spaced apart from one another;
wherein the first section comprises the first cylindrical portion, the first outer perimeter portion, and the first and second wings; and
wherein the second section comprises the second cylindrical portion, the second outer perimeter portion, and the third and fourth wings.

13. The isolator of claim 12 wherein the first section further comprises a first bumper extending outwardly therefrom; and
wherein the second section further comprises second and third bumpers extending outwardly therefrom and defining a recess therebetween; and
wherein the first bumper extends into the recess between the second and third bumpers and is spaced apart from the second section with the isolator in an unloaded state.

14. The isolator of claim 10 wherein the first and second cylindrical portions are connected to one another only via the first and second flexible couplings; and
wherein a center-to-center distance between the first and second apertures is greater than a length of each of the first and second flexible couplings.

15. A vehicle comprising:
a chassis having a first hanger extending therefrom;
an isolator comprising an elastomeric body defining first and second apertures therethrough, a first metal support bracket extending through a first outer region of the body, a second metal support bracket extending through a second outer region of the body, and first and second flexible couplings, wherein each coupling connects the first bracket to the second bracket, wherein the first hanger extends through the first aperture; and
a vehicle component suspended from the chassis by a second hanger extending through the second aperture of the isolator.

16. The vehicle of claim 15 wherein the vehicle component is a component in an engine exhaust system.

17. The vehicle of claim 15 wherein the first and second brackets of the isolator each comprise a rigid metal strip embedded in the elastomeric body;
wherein the first and second flexible couplings of the isolator each comprise metal braid; and
wherein the first bracket, the first coupling, the second bracket, and the second coupling are arranged sequentially about an outer perimeter region of the elastomeric body of the isolator.

18. The vehicle of claim 15 wherein the elastomeric body further comprises a first section defining the first aperture and a second section defining the second aperture, the first and second sections spaced apart from one another; and
wherein a load from the second hanger and second section of the elastomeric body to the first hanger and first section of the elastomeric body is entirely supported by the first and second flexible couplings.

19. A method of assembling an isolator, the method comprising:

providing first and second support brackets, each support bracket extending from a first end to a second end;

forming an elastomeric member having first and second apertures therethrough, the elastomeric member formed about each of the first and second support brackets such that an intermediate region of each of the brackets is embedded in an outer perimeter region of the elastomeric member, and the first and second support brackets are spaced apart from and opposite to one another;

connecting first ends of each of the support brackets to one another with a first flexible coupling; and connecting second ends of each of the support brackets to one another with a second flexible coupling.

20. The method of claim 19 wherein the elastomeric member is formed as a first section and a separate second section, the first section defining the first aperture and having the first support bracket embedded therein, and the second section defining the second aperture and having the second support bracket therein; and wherein the first and second flexible couplings connect the first and second sections of the elastomeric member to one another.

\* \* \* \* \*